Aug. 8, 1944.  L. A. KOEVORT  2,355,306
POWER-TRANSMISSION MEANS FOR MOTOR VEHICLES
Filed Nov. 17, 1941
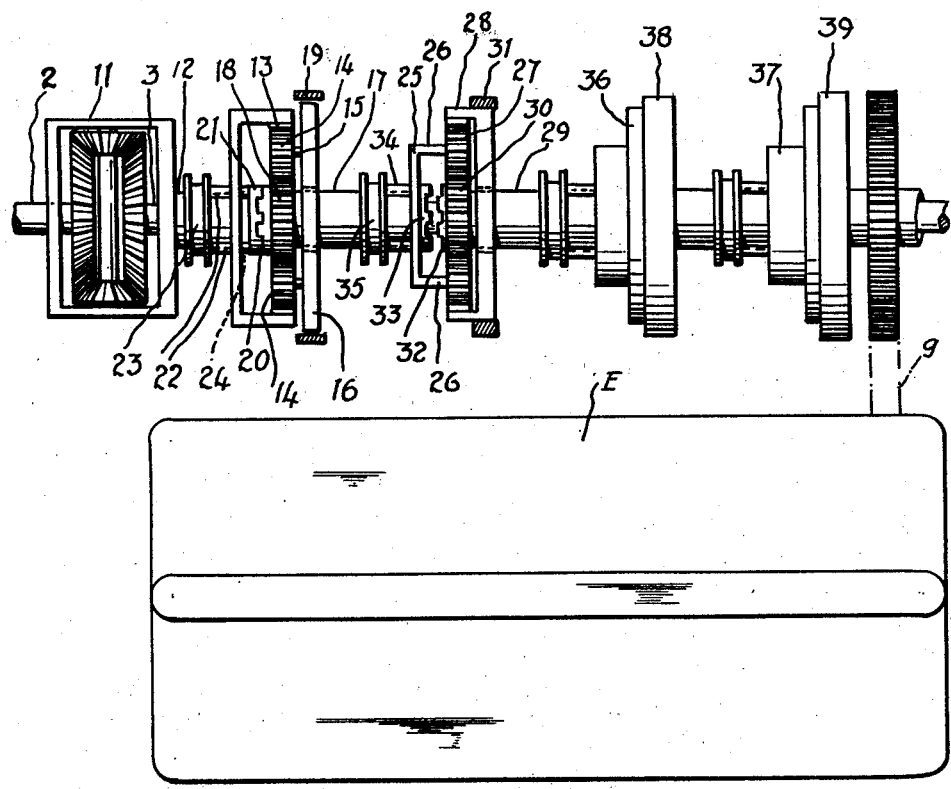

Patented Aug. 8, 1944

2,355,306

UNITED STATES PATENT OFFICE 2,355,306

POWER-TRANSMISSION MEANS FOR MOTOR VEHICLES

Leslie Adcock Koevort, Overport, Durban, Natal, Union of South Africa

Application November 17, 1941, Serial No. 419,484
In the Union of South Africa December 6, 1940

3 Claims. (Cl. 74—328)

This invention relates to power-transmission means for motor vehicles, of the type which comprises in combination, a change-speed gear-set having its axes arranged transversely to the vehicle chassis, a reduction gearing arranged at any convenient point in the transmission between the crankshaft of the engine, which is also arranged transversely to the chassis, and the differential gearing of the driving axles of the vehicle, and a clutch arranged at any convenient point in the transmission between the crankshaft and the differential gearing.

The object of the present invention is to reduce the space which has hitherto been required for power-transmission means of the type stated.

According to the invention, I provide a power-transmission means of the aforesaid type in which a shaft or member of the gear-set adapted to transmit its drive directly, or through a reduction gear and/or a clutch, to the differential gearing, is arranged coaxially with one of the driving axles of the vehicle, e. g., in the form of a tubular shaft rotatable on the said axle.

The drive from the crankshaft of the engine to the said tubular shaft or member coaxial with the driving axle may be transmitted through an intermediate gear-shaft or member having its axis parallel to but independent from the axes of the driving axle and the crankshaft; and this intermediate gear-shaft when employed may carry cams for operating the engine valves, and thus serve as a cam-shaft. Alternatively, the tubular shaft or member connected to the differential gearing may be driven by means of epicyclic gears arranged coaxially with the said shaft or member, in which case the whole gear-set is coaxial with the driving axle, thereby further reducing the space occupied.

The transmission means although primarily intended for a rear axle drive may be effectively applied to a front axle drive.

Power-transmission means, embodying the invention as applied to a rear axle drive, will now be described, by way of example, with reference to the annexed drawing, in which the figure shows a diagrammatic plan view of a power-transmission means according to the invention, in which the gear-set embodies epicyclic gears and is arranged as a whole coaxially with the rear axle.

In the construction shown the differential cage 11 is fixed to a sleeve 12 which is coaxial with and rotatable on the rear axle 3. The opposite end of the sleeve 12 has a ring gear 13 fixed thereon, which latter meshes with planet wheels 14 which are carried by spindles 15 projecting from the face of a disc 16 which is rotatably mounted on a sleeve 17. The sleeve 17 has a sun wheel 18 fixed thereto and this sun wheel meshes with the planet wheels 14. The disc 16 is adapted to be held at will against rotation by means of a spring-pressed friction band 19 and to be released from the clamping action of this band by the gear-shift lever or like control device (not shown) of the vehicle. On the face of the sun wheel 18 one member 20 of a dog clutch is provided, the other member 21 of the clutch being carried by four horizontal pins 22 equi-angularly spaced with respect to a collar 23 to which they are fixed, and with respect to the ring gear 13 through holes 24 in which the pins 22 are slidable, i. e., for the purpose of engaging the clutch member 21 with the clutch member 20 in order to establish a direct drive from the ring gear 13 to the sun wheel 18, and for the purpose of disengaging the clutch member 21 from the clutch member 20 in order to substitute for this direct drive a reverse drive of reduced gear ratio from the ring gear 13 to the sun wheel 18 through the planet wheels 14.

The epicyclic gearing 12 to 24 just described constitutes the reverse gear of the vehicle and the drive thereto from the engine E is adapted to take place through chain or other gearing g and three ahead or forward gears now to be described. Each of these gears is of a different gear ratio from the others, so as to give the low, middle and high forward speeds customary in the case of motor vehicles, but in general construction these forward gears are similar to one another and reference therefore will be made only to one of them, viz., the low forward gear, in detail. This latter gear lies adjacent to the reverse gear already described and comprises a disc 25 fixed upon the sleeve 17 and having spindles 26 projecting from its face on which planet wheels 27 are rotatably mounted. These planet wheels mesh, on the one hand, with a ring gear 28 rotatably mounted on a sleeve 29, and mesh on the other hand with a sun wheel 30 fixed upon the end of the sleeve 29. The ring gear 28 is adapted to be held at will against rotation by means of a spring-pressed friction band 31 and to be released from the clamping action of this band by the gear-shift lever or like control device (not shown) of the vehicle. One member 32 of a dog clutch is provided on the face of the sun wheel 30 and the other member 33 of the clutch is supported by four pins 34 carried by a collar 35, which is slidable on the sleeve 17 for the purpose of moving the clutch member 33 into and out of engagement with the clutch member 32. As will be apparent when the members 32 and 33 of the dog clutch are engaged, the disc 25 is driven by the sun wheel 30 directly and the epicyclic gear transmission which takes place through the planet wheels 27 and ring gear 28 when the dog clutch is open, is eliminated.

The construction of the middle ahead gear 36 and the high ahead gear 37 is similar to the construction of the low ahead gear 25 to 35 just described, with the exception that the transmission ratio of the epicyclic gearing in these gears is different. The arrangement of the gear-shift lever or like control device is such that any one of the friction bands 19, 31, 38 and 39 of the reverse gear and of the low, middle and high forward gears may be caused to clamp its respective co-operating element, i. e., the planet wheel disc 16 in the case of the reverse gear, and the respective ring gear in the case of the forward gears, e. g., the ring gear 28 in the case of the low forward gear, while the remaining friction bands are released. Simultaneously the dog clutches of the three gears of which the friction bands are released remain closed, i. e., their members remain in engagement, while in the case of the gear of which the friction band is clamped upon its co-operating element, the dog clutch is opened. As a result, the drive from the engine E to the differential cage 11 will take place as a solid drive through the three gears first mentioned, whilst in the case of the fourth gear the drive will be transmitted in the desired direction and with the desired reduction or speed ratio, through the epicyclic means. The gearing is illustrated as for low forward transmission, i. e., the friction band 31 is clamped upon and holds stationary the ring gear 28, and the dog clutch members 32, 33 are disengaged.

It will be obvious from the foregoing that the power-transmission means, particularly in the case of the construction shown is very compact, and in both cases, of course, the customary bevel or worm drive to the differential is dispensed with.

The engine, gear box and differential may conveniently be constructed as a single unit adapted to be mounted on the rear part of the chassis, the controls being operated by means of flexible cables and/or rods from the dashboard of the vehicle. The rear disposition of the engine eliminates or reduces the usual objectionableness of fumes which arise when a Diesel engine is employed and thus the engine is particularly suitable for use with such engines.

By installing suitable epicyclic gearing, three or four gear ratios in either direction may be obtained, which arrangement is specially suitable for armoured cars, light tanks and other heavy vehicles. As applied to these cars, the invention has the added advantage that the unit comprising the engine, gear-set and differential may be taken out and replaced readily.

In the rear or driving axles, adjacent to the wheel hubs, universal joints may be incorporated.

I claim:

1. Means for transmitting power to the differential gearing of the wheel carrying axles of a motor vehicle, comprising a series of change speed gear sets mounted successively on one of said axles between a power means and the differential gearing, certain such gear sets including a tubular shaft free on the axle, a disc rotatable on the tubular shaft, a ring gear carried by the disc, and a planetary gearing including a sun wheel fixed to the tubular shaft and planet wheels carried by the disc and in constant mesh with the ring gear, manually operable clutch means to operatively connect the tubular shaft of one gear set to the tubular shaft of the adjacent gear set toward the differential at will, an element carried by such tubular shaft of the adjacent gear set and operatively supporting the planet wheels of the planetary gearing of the adjacent gear set toward the power means, and means to manually fix the disc against movement by the cooperating planetary gear.

2. A construction as defined in claim 1, wherein the means for operatively connecting the tubular shafts of adjacent gear sets includes a clutch member carried by one such tubular shaft and a cooperating clutch member slidably and non-rotatably mounted on the adjacent tubular shaft.

3. A construction as defined in claim 1, wherein the gear ratios of the respective gear sets vary one from the other to provide for relative different speeds in the drive of the axle.

LESLIE ADCOCK KOEVORT.